United States Patent [19]

Wille-Fier et al.

[11] Patent Number: 5,596,572
[45] Date of Patent: Jan. 21, 1997

[54] SYSTEM FOR COORDINATING CONNECTION REQUESTS

[75] Inventors: Regina Wille-Fier, Deisenhofen, Germany; John W. Cutler, Coventry, Great Britain

[73] Assignees: Siemens Aktiengesellschaft, Munich, Germany; GPT Ltd., Coventry, United Kingdom

[21] Appl. No.: 392,755

[22] PCT Filed: Aug. 25, 1993

[86] PCT No.: PCT/EP93/02288

§ 371 Date: May 25, 1995

§ 102(e) Date: May 25, 1995

[87] PCT Pub. No.: WO94/05122

PCT Pub. Date: Mar. 3, 1994

[30] Foreign Application Priority Data

Aug. 25, 1992 [DE] Germany .................. 92 114 474.7

[51] Int. Cl.[6] .................................................. H04Q 11/04
[52] U.S. Cl. ........................... 370/360; 370/384; 370/395
[58] Field of Search ..................... 370/54, 58.1, 58.2, 370/58.3, 60, 60.1, 61, 68.1, 94.1, 94.2, 110.1; 379/268, 269, 271, 272, 273; 340/825.03, 826, 827

[56] References Cited

U.S. PATENT DOCUMENTS

| 4,821,256 | 4/1989 | Schmidt et al. | 370/58.2 |
| 4,903,258 | 2/1990 | Kuhlmann et al. | 370/58.2 |
| 5,051,982 | 9/1991 | Brown et al. | 370/58.2 |
| 5,390,171 | 2/1995 | Storm | 370/58.2 |
| 5,434,852 | 7/1995 | La Porta et al. | 370/58.2 |

Primary Examiner—Alpus H. Hsu
Attorney, Agent, or Firm—Hill, Steadman & Simpson

[57] ABSTRACT

A coordination system coordinates connection requests of a modular connection system to a switching control system. The connection system controls connections at a logic level, and the switching control system controls connections at a physical level. Coordination modules have the following elements. A receiver receives and buffer-stores connection requests produced from the connection system for an active connection end point involved with a connection. A connection request, which is buffer-stored by the coordination modules, is passed on to the switching control system when the coordination modules have received control over an active connection end point. Control over a specific active connection end point is surrendered to one another such that only one coordination module has control over this specific active connection end point at a specific point in time.

7 Claims, 14 Drawing Sheets

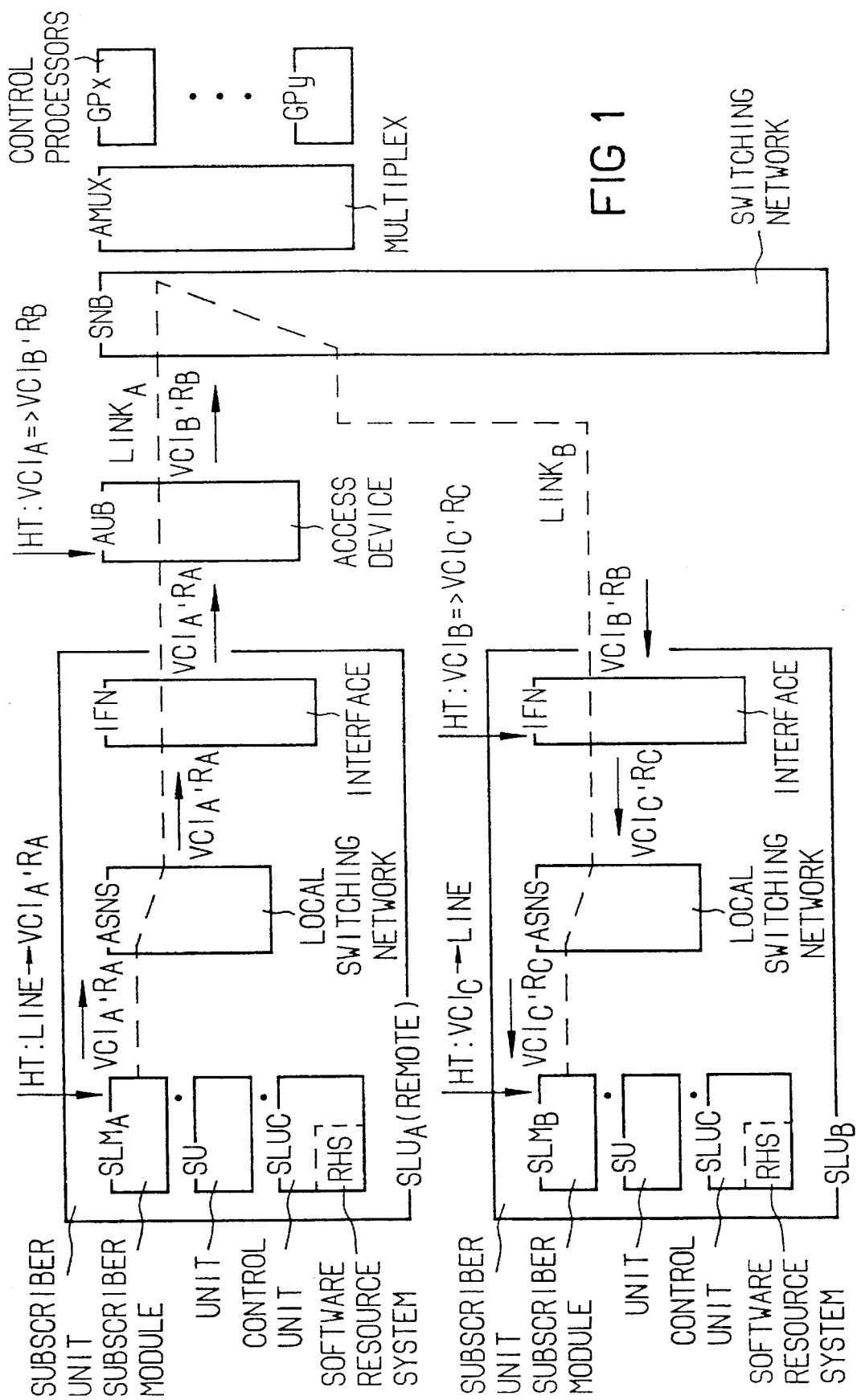

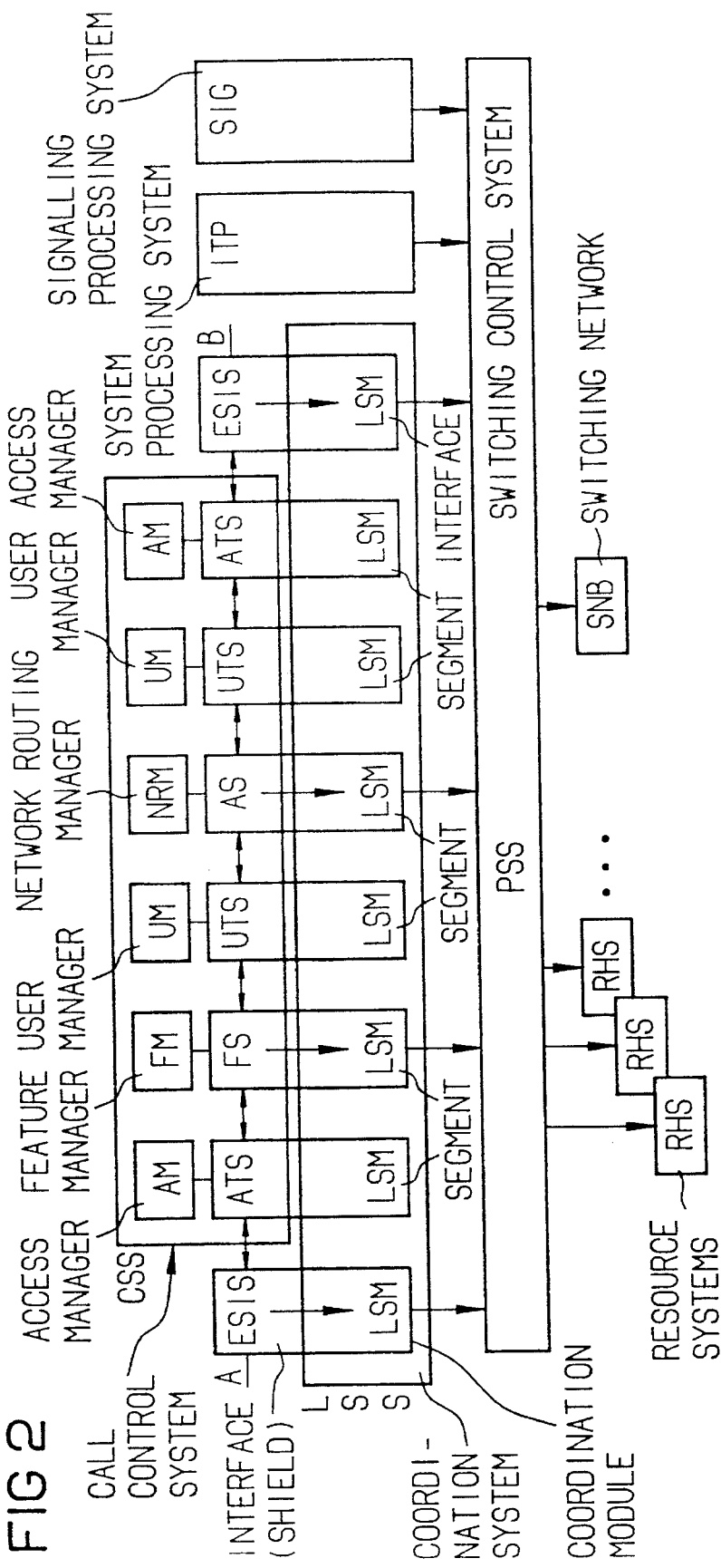

FIG 4
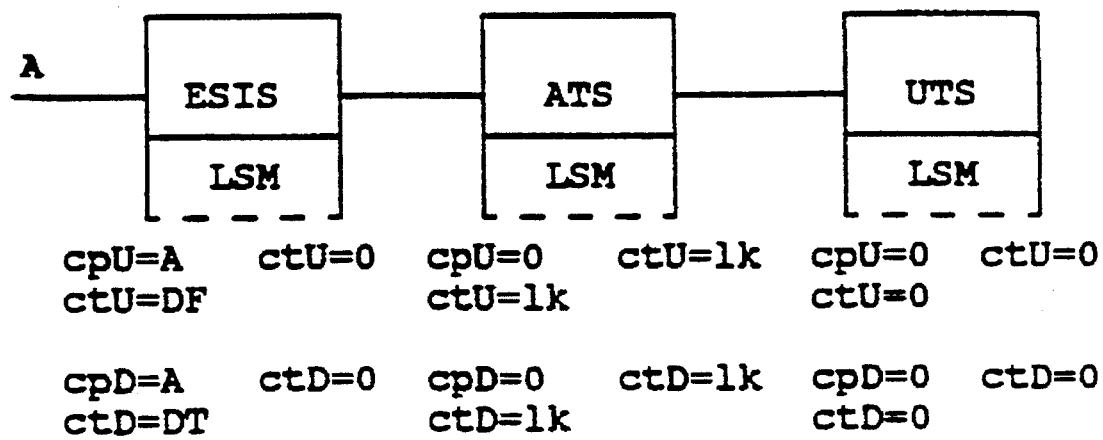
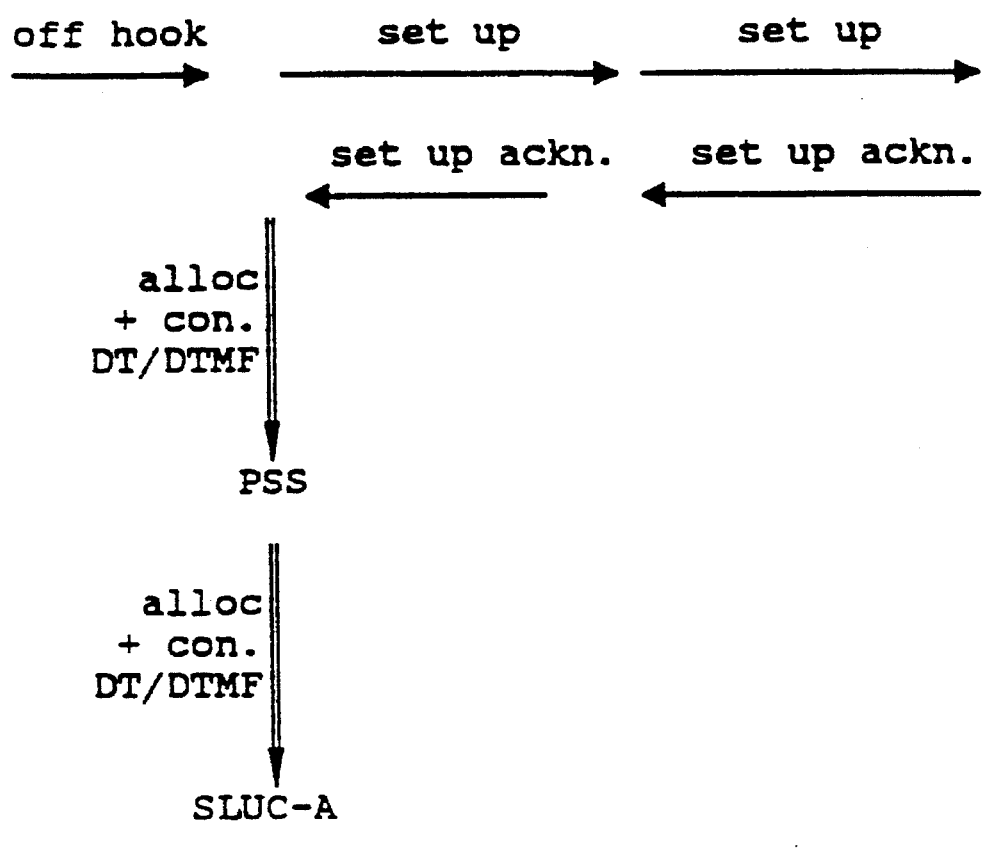
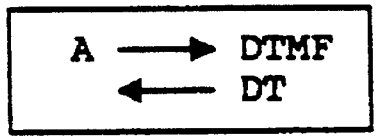
path envelope ESIS-A

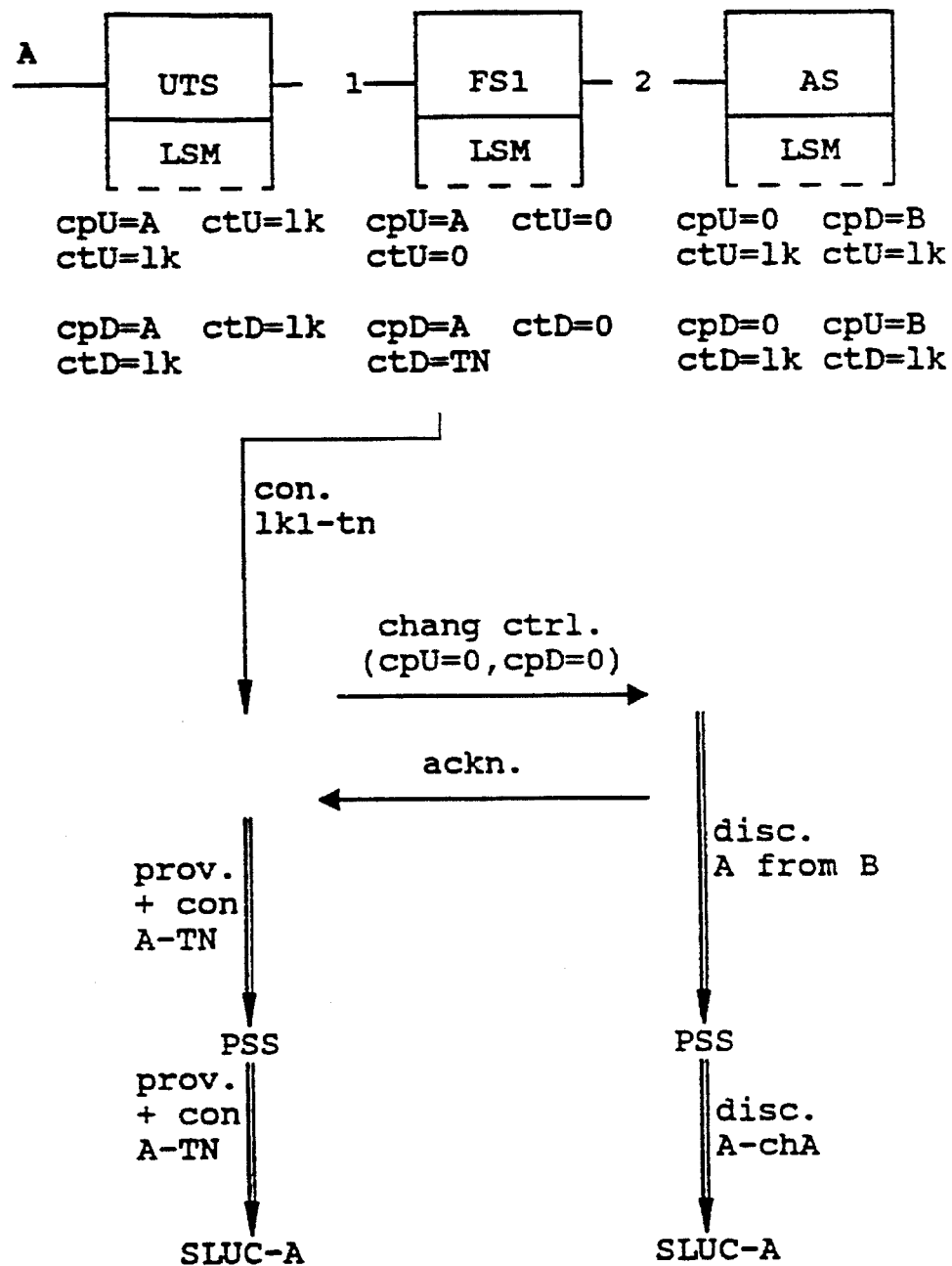
FIG 9
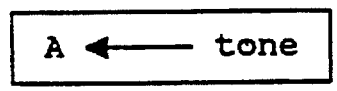
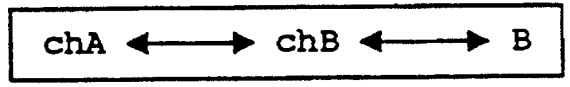

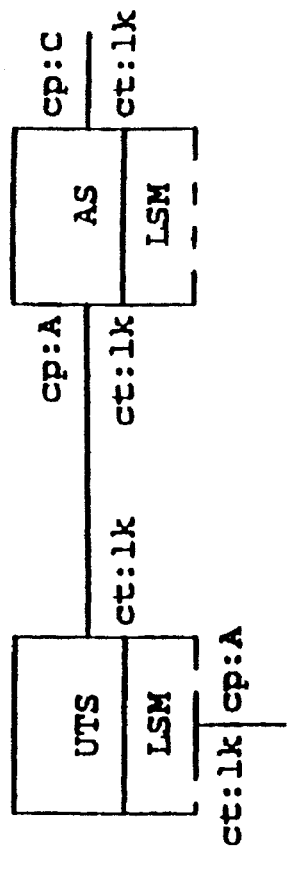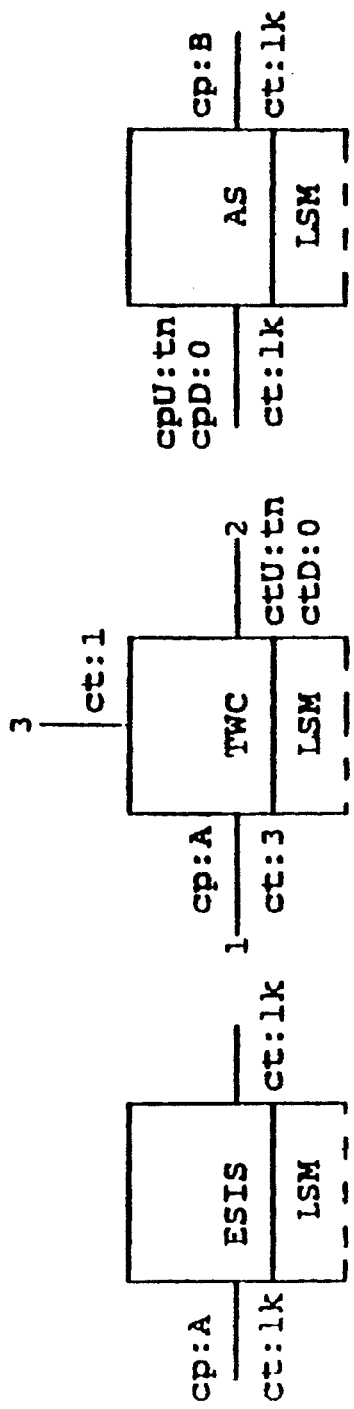
FIG 14

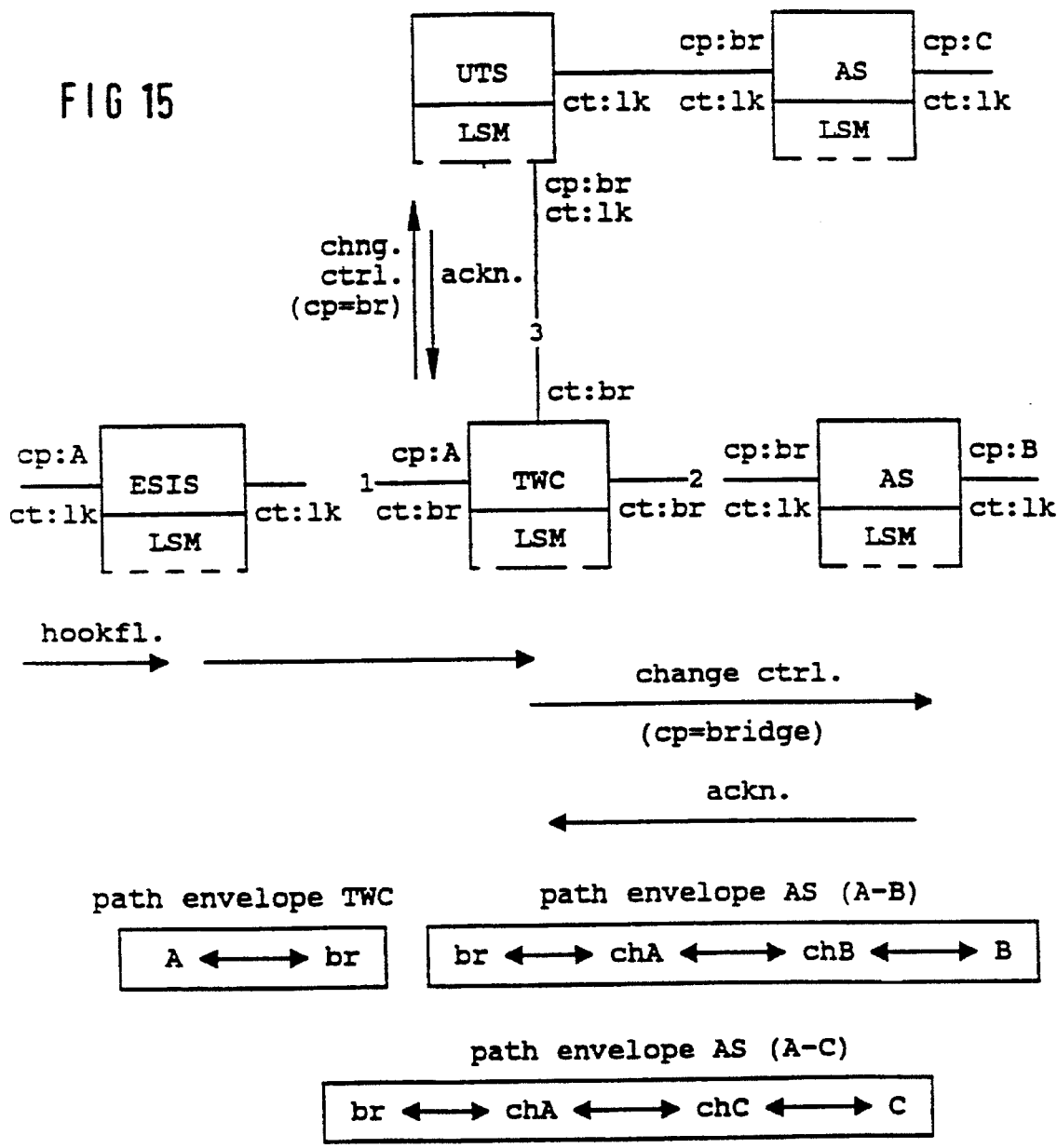
FIG 15  5. initiate 3way-call on hook flash (bridge in A-side switch)

SYSTEM FOR COORDINATING CONNECTION REQUESTS

BACKGROUND OF THE INVENTION

In the development of future switching systems, efforts are being made to design software systems which are as modular as possible for controlling the switching system. This is being done primarily with respect to better decoupling of the individual functions of a switching system and thus of a simpler subsequent modification capability and improved reusability of the switching software in further developments.

General considerations of the possibility of priority assignment to processes are known, inter alia, from the Article "Proze-Prozessor-Zuordnung in Multi prozessorsystemen mit globalen und lokalen Speicher resourcen zur Steuerung von Vermittlungsprozessen" [Process-processor assignment in multiprocessor systems having global and local memory resources for controlling switching processes] by H.-J. Schwertfeger in the Journal Nachrichtentechnik Elektronik [Telecommunications Electronics], Vol. 35, No. 10, 1985, Berlin, pages 365–370.

A general software model for an ATM switch node is known from the article "An ATM-Switching Test" by G. P. Balbony et. at., in the document European Trans actions on Telecommunications and related Technologies, Vol. 2, No. 4, Aug. 1991, Milan, pages 391–401.

In modular connection systems for controlling connections at the logic level, it is highly conducive for the improvement of the modularization capability if the modules of such a connection system are able to submit autonomous connection requests to a switching control system for controlling the connections at the physical level. However, problems in the coordination of the connection control result from this autonomous production of connection requests.

SUMMARY OF THE INVENTION

The invention is based on the problem of specifying a coordination system by means of which coordination of the autonomous connection requests of a connection system for controlling connections at the logic level is achieved with respect to a switching control system for controlling connections at the physical level.

This problem is solved by a coordination system for coordinating connection requests of a modular connection system to a switching control system, the connection system being used for controlling connections at the logic level, and the switching control system being used to control connections at the physical level. The coordination system has coordination modules which are designed such that they:

receive from the connection system and buffer-store connection requests produced for an active connection end point involved with the connection;

pass on a connection request, which is buffer-stored by them, to the switching control system when they have received control over an active connection end point; and surrender control over a specific active connection end point to one another in such a manner that only one coordination module ever has control over this active connection end point at a specific point in time.

The coordination system according to the invention results in it only ever being possible to submit one connection request to the resource control system, of the connection requests produced by the connection system, at a specific point in time. This ensures a logically sensible sequence of connection requests to the resource control system.

In a further embodiment of the present invention the coordination system has:

coordination modules of a first type which are designed in such a manner that they can achieve control over in each case one active connection end point of a connection;

coordination modules of a second type which are designed in such a manner that they can achieve control over in each case two active connection end points of a connection, there being in each case only one coordination module of the second type per connection end point pair in the coordination module chain of a connection; and priority control in accordance with which a coordination module has higher priority with respect to the control of a connection end point the closer it is to the end point of the coordination module chain.

a connection is divided into a plurality of connection ends, one connection end and thus the associated coordination modules being bounded by an active connection end point and at least one central coordination module. This results in it being made possible for connection requests for an individual active connection end point to have to be coordinated only within one connection end, that is to say among the coordination modules of a single connection end. Since the central coordination module has the lowest priority, it cannot achieve control over the associated two connection ends until all the coordination modules at these two connection ends have, for their part, released control. This results in those connection requests on the basis of which two active connection end points involved in the connection are intended to be connected and which are thus at the end of a connection control process not being able to be passed through by the central coordination module until all the preparatory control processes have been completed. This avoids such a connection request being passed through prematurely.

In another embodiment of the present invention a coordination module is designed in such a manner that it can pass on a connection request for a connection end point over which, in principle, it cannot achieve control to another coordination module which can achieve control over this connection end point. This results in a coordination module also being able to pass a connection request through for a connection end point over which it can itself not achieve control.

In yet a further embodiment of the present invention one and only one coordination module is permanently assigned to teach module of the connection system, and the communication of the coordination modules takes place via the communications channels of the modules of the connection system. In yet another embodiment of the present invention a coordination module is designed in such a manner that the transfer of a connection request into a coordination module conforms with a procedure call. This embodiments of the invention have the advantage that the dynamic complexity for the connection-related communication is in consequence reduced.

In another embodiment of the present invention the coordination modules are designed in such a manner that they translate the connection requests passed to them in each case into a connection command which is comprehensible for the switching control system. This embodiment of the invention has the advantage that the decoupling of the connection system from the switching control system is in consequence improved.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows the structure of an ATM switching system.

FIG. 2 shows the modular composition of the call processing system.

FIG. 3 shows the view of the segments of the connection system and of the coordination modules of the coordination system with respect to a connection.

FIGS. 4 to 8 show the sequence of setting up a connection in terms of location.

FIGS. 9 and 10 show the sequence when a tone is applied to a stable call.

FIGS. 11 to 15 show the sequence for setting up a three-way call in the presence of a stable two-way call.

DESCRIPTION OF THE PREFERRED EMBODIMENTS

Figure 5:
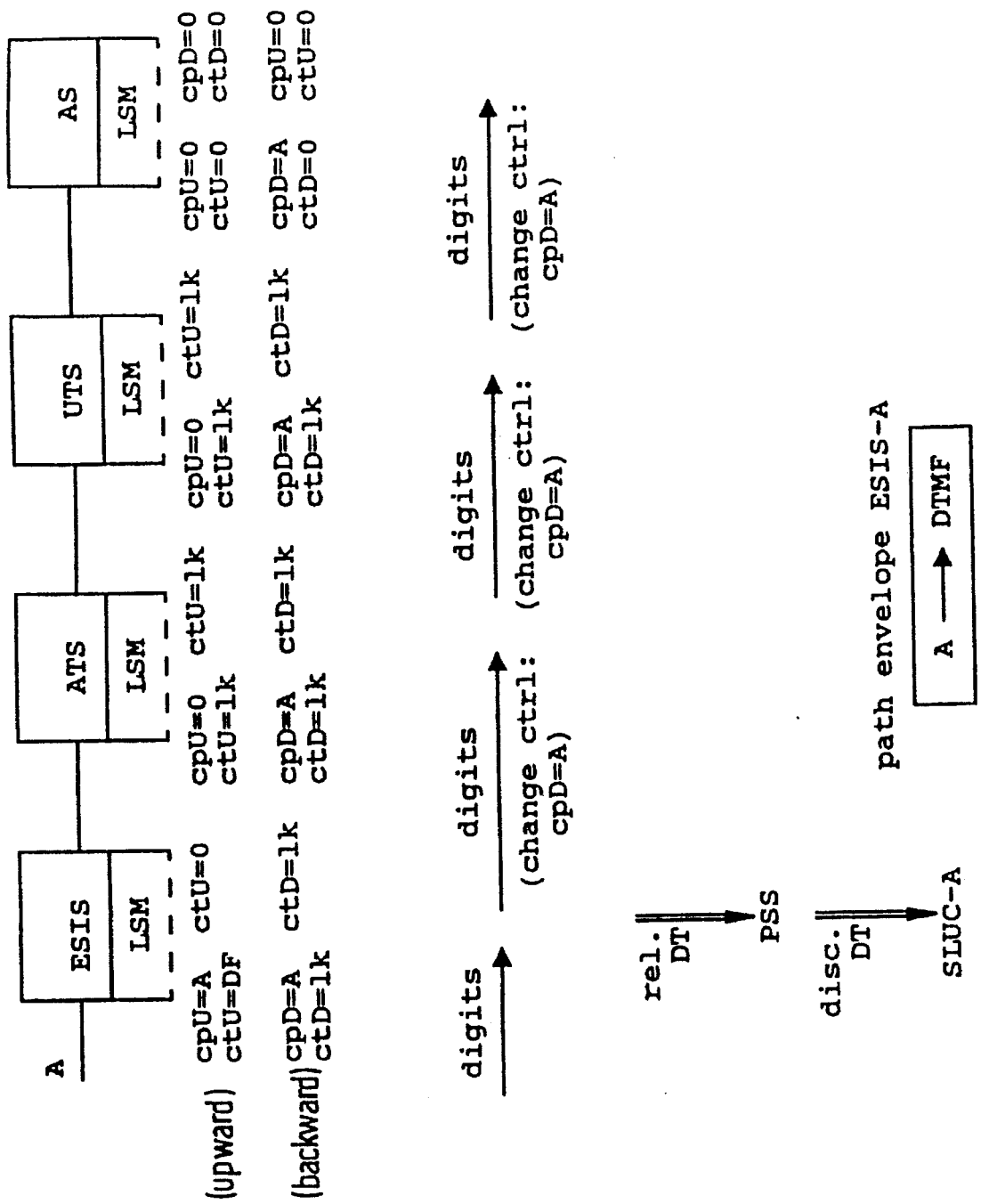

FIG. 1 shows the structure of an ATM switching system in which the software structure according to the invention can be used to implement the network layer.

The principles of the switching functions for setting up STM connections or ATM connections are comparable. Thus, for example, a virtual path through the relevant switching networks is also specified for an ATM connection before the actual data transfer starts. All the cells in an ATM connection are transferred via this path. In general, a plurality of connections will be involved in an ATM link. ATM cells which belong to the same connection are assigned the same VCI/VPI identifier (virtual connection/path identifier) in the cell header.

A selected path must be reserved in software lists for all links which produce a traffic concentration, in order to prevent an overload on the ATM links.

The number of cells which are transferred in a specific time interval defines the bandwidth which is occupied on a link by a specific ATM connection. The associated bandwidth is monitored in a connection-specific manner by a user/network interface in order to prevent the switching networks being flooded in an unauthorized manner by a specific user (policing). The said software list is controlled by a software resource system RHS, which is implemented in a control directory unit SLUC of a subscriber unit SLU.

The VCI/VPI identifier which is assigned to a specific ATM connection and is abbreviated in FIG. 1 with the designation VCI is always valid for a specific link. Before the ATM cells are transferred onwards on another link, a new VCI/VPI identifier is entered in the header of an ATM cell (header translation HT). This header translation likewise takes place on the user/network interface which is not illustrated.

The header translation is additionally carried out in each case before passing through a switching network. In this case, a routing identifier R, which describes the specified path through the following switching network, is attached to an ATM cell at the same time as the entry of a new VCI/VPI identifier. The routing identifier R is evaluated within the following switching network in order to switch the cell through to the correct outgoing link. For a virtual path, only the VPI identifier is calculated again in the interface circuit IFH or in the access device AU (in the case of a remote SLU), while the VCI identifier, which is assigned to the individual connections, remains unchanged. All the cells having the same VPI identifier thus receive the same routing identifiers, which makes it possible for a plurality of virtual connections to be switched in a transparent manner over the same virtual path.

FIG. 1 shows the header translation for a virtual ATM connection via the main switching network SNB. A one-way connection from a subscriber line unit SLUA to a subscriber line unit SLUB is illustrated as the virtual ATM connection. The header translations carried out for one ATM cell are described in more detail in the following text.

The first header translation HT is carried out by the subscriber module SLMA. In this subscriber module, the routing identifiers RA for the path through the local switching network ASNS of the subscriber unit SLUA are attached to the ATM cells, and the VCIA identifier is entered in the header of the ATM cells.

The second header translation for the central switching network SNB is produced by the broadband access device AUB. In this broadband access device, all the incoming cells having the path identifier VCIA receive a new path identifier VCIB and a new routing identifier RB for the path through the main switching network SNB.

The third, and last, header translation is carried out in the subscriber unit SLUB at the B-end in the IFH. There, all the incoming cells having the path identifier VCIB receive a new path identifier VPIC, as well as new routing identifiers RC for the path through the local switching network ASNS of the subscriber unit SLUB.

FIG. 2 shows the modular composition of a specific user system, namely the call processing system for controlling calls and its arrangement with respect to further software systems for controlling connections within a switching system.

The call processing system comprises a call control system CCS for controlling a connection at the logic level, an interface system ESIS for shielding the call control system from different signaling variants, and a coordination system LSS for coordination of the logic connection requests, which are produced by the call control system, with respect to a switching control system PSS. The interface system ESIS and the call control system can be combined as a specific connection system, namely they can be considered as or called a call connection system. The switching control system can be considered as the central controller of a resource control system.

Furthermore, a processing system ITP (system administration) and a processing system SIG (signaling administration) for controlling signaling connections of a signaling system are illustrated at the same level as the call processing system. In the same way as the call processing system, these processing systems contain connection systems which use the switching control system PSS to implement their logic connection wishes at the physical level.

FIG. 2 furthermore shows the decentralized part of the resource control system, namely resource systems RHS for local control of the resources of the switching system, and the main switching network SNB which is controlled directly by the switching control system, as the single resource of the switching system.

The following text describes the call processing system.

The ESIS produces the shielding of the call control system CCS from different signaling variants, by converting the different signaling schemes into a general information interface between the ESIS and CCS. The internal structure of the ESIS is strictly modular, with separate software modules for every supported signaling system and every variant of it. Corresponding entities are produced or removed by these software modules in conjunction with connections, depending on which connection-specific signaling requests occur. However, despite the different software modules, the call control system CCS always sees a general information interface to the ESIS.

In addition, the ESIS is responsible for the connection-related signaling interchange between different signaling systems.

The call control system CCS is used for controlling the connection at the logic level. Its tasks include traffic routing, standard connection setting up and clearing down, handling of performance features, informing the charge system and the statistical system of call events, etc. The area of the CCS tasks does not include the control of setting up and clearing down the physical connection. This is admittedly initialized by the CCS, but it is controlled autonomously by the switching control system PSS. Only those tasks of the CCS which relate to connection control are considered in more detail in the following text.

The CCS comprises two types of software units, namely steady-state modules (managers) and transient modules, which are designated call segments. The said call segments produce a series of entities (process entities or data entities) per connection, which entities communicate with one another via a common information interface. In the following text, the said entities are also designated segments, and the communicating series of entities is also designated a call chain.

The call segments include access segments ATS which represent the technical features of the relevant port, user segments UTS which represent the performance features of the user, associated segments AS which represent the association of the A-end and the B-end, and feature segments FS which do represent non-standard features of a connection, that is to say individual features. The said call segments for a connection are produced or removed as a function of connection-specific requests and subscriber/network features.

The coordination system LSS coordinates connection requests which originate from different call segments and ESIS segments. For this purpose, the coordination system must buffer store the connection requests received from each segment. This is done in a coordination module LSM, which is assigned per segment. Every time a switching coordination module receives a new connection request from a segment, the status of the coordination module is evaluated and updated. A distributed control mechanism between the coordination modules ensures that the coordination system provides a consistent physical connection request with respect to the switching control system PSS.

The switching control system is described in the following text.

The switching control system is a basic service system for all the user systems of the switching system which request connections within the switching system. Apart from simple connection requests, the switching control system also deals with specific connection requests for the reconfiguration of connections which have been set up for the user systems.

The switching control system produces in each case one autonomous entity per connection request. In consequence, the interactions between the switching control system and the resource systems and main switching network are independent of the status of the entities of the respective user system.

The coordination system transforms the private view of a connection, which can be adapted to the segments (entities) of the call control system and of the signaling interface system, into a single consistent connection request with respect to the switching control system. For this reason, the switching control system may carry out connection orders from the coordination system in an unconditional manner. The only reasons for a negative acknowledgement to the coordination system are blocking conditions of the controllers of the switching networks (for example a negative acknowledgement from one of the resource systems RHS) or defects in the switching networks themselves (for example a negative acknowledgement from individual switching networks).

Every connection request to the switching control system causes a new transaction of the switching control system. Such a transaction comprises the control of the resource systems involved and thus the coordination of the setting up of a physical path through the switching networks of the switching system.

Since the actual resource handling (path resources and service unit resources) is separated from the switching control system and is carried out by resource systems independent of them, the switching control system does not require any assignment to a specific central control processor of the central control processors GPx, . . . GPy (see FIG. 1). Furthermore, there is no limitation on having to use connection requests, which originate from the same call chain, on the same entity of the PSS. This allows very effective implementation of the functions of the switching control system within the hardware system. Every central control processor can thus operate a plurality of entities of the switching control system in parallel. In consequence, a user system can always submit its connection requests to a switching control system of its own central control processor. Since the switching control system waits for confirmations of the resource systems and/or of the main switching network, it is possible to carry out parallel execution of connection requests for different connections on in each case one single central control processor. For this purpose, one specific particularizing mechanism must be made available per central control processor (for example process particularizing or data particularizing).

Resources which are assigned to a connection must be stored in a connection-specific manner for the duration of a connection in order to be able to clear down the connection at the end. If these data were stored in the switching control system, it would have to be of considerably more complex construction. For example, a PSS entity would in each case have to be given for the entire duration of the connection, which would necessitate an additional state/event coupling within the PSS and, furthermore, new checks for consistency of the connection requests between the PSS and the user systems. In order to avoid this increased complexity, the connection data are stored within the respective user system. For example, the connection data for the call processing system are stored in data fields assigned to the coordination system. In order to implement this concept, a so-called "path envelope" is passed backwards and forwards between the user system and the switching control system, which path envelope the current connection data (path data and other resource data) contain. While the path envelope for the user system is a black box, the contents of this path envelope are evaluated by the switching control system in order to carry out an optimum path search for the connection requests.

In summary, the switching control system thus represents an interface between the call processing system and the resource systems and/or the main switching network, which interface allows the call processing system to submit combined connection requests, which contain a resource operation and switching, in a single connection request to the switching control system. In this context, the switching control system ensures that the combined connection request is carried out in a coordinated manner.

The call control system is described in more detail in the following text.

As already mentioned, the call control system comprises two types of software units, namely steady-state units (managers) and transient units (segments).

Steady-state managers mainly control long-life call processing entities, for example a telephone number of a subscriber or the type of a port. There is in each case one steady-state manager per entity, which forms a neutral interface between the call processing and the steady-state data base. Steady-state managers thus shield the connection control from the structure of the physical data base. In addition to the respective entity, they carry out functions related such as busy/idle-handling operations. In order to achieve efficiency in real time, steady-state managers are located physically close to the data controlled by them and can thus be contained within a software capsule of the physical data base. Steady-state managers furthermore identify all the active transient segments (entities) to which they are currently making their services available, and supply these active transient segments, as a response, with data in a format which is defined for call processing.

Transient segments control short-life entities, for example a standard connection or a performance feature. Transient segments are produced or destroyed on the basis of user/network actions such as "going off hook" or "placing down", and carry out logic call control functions, such as operations for making a port busy or releasing it and carrying out specific actions for a performance feature. At the start of a connection, the transient segments are produced and are used at their respectively associated steady-state managers in order to obtain the data required by them from the data base. The transient segments store the data received and work with these data throughout the entire duration of a connection. At the end of a connection, the transient segments are destroyed, and the transient data controlled by them are thus also destroyed.

The individual types of steady-state manager are described in more detail in the following text: An access manager AM represents a physical subscriber/network access which is independent of the signaling type and is defined by a logic access identifier. This manager identifies the resources (channels, bandwidth and terminals) associated with a specific physical access, as well as blocking conditions and logic user identifiers associated with this physical access. In addition, an access manager carries out the access-related free/busy handling operation and assigns the access resources required for this purpose (for example assignment of a VPI/VCI number).

Finally, an access manager must in each case define, for the transient segments operated by it, the link to the entities required by the next transient segment. In the case of an A-connection end, "define a link" for the access manager means the definition of a logic user identifier. This requires either checking a logic user identifier supplied by the user himself or determining a logic user identifier assigned to the present physical access (for example in the case of an analog user). In the case of a B-connection end, the definition of a link means, for the access manager, the definition of the logic signaling type identifier. This is determined on the basis of the logic access identifier and, possibly, predetermined terminals.

A user manager UM represents a subscriber (user) who is defined by a logic user identifier (for example a telephone number). This manager identifies the limits, provided for the specific user, for the request on the basis of resources, administrative blocking conditions and features of the user. The user manager is responsible for all the standard call processing functions which are related to the said user-related data. The user manager also carries out the user-related free/busy handling operation and assigns request user resources. Finally, in the case of a user at the B-connection end, the user manager defines the logic access identification which forms the link to the entities of the next transient segment (ATS segment).

A feature manager FM is required for individual features. It controls feature-related data which are associated with the subscriber or the group which has subscribed to this performance feature. The feature manager results in the feature data being separated from the normal subscriber data, so that an extension to or a change of the performance features does not necessarily exert any influence on the standard call processing.

A trunk group manager TGM controls a logic trunk group. It carries out trunk selection at the outgoing connection end and marks a channel of the trunk group at the incoming connection end as busy. Furthermore, it supplies trunk-group-related data to a trunk group segment TGS.

A network routing manager NRM evaluates the received information (for example dialed digits) with the aid of a translator, and defines a suitable connection handling operation. The NRM can control a plurality of translators (for example POTS, CENTREX, packet etc.), which can be added and controlled in accordance with the wishes of the customers. The neutral interface between call segments and the network routing manager shields the call segments from the specific architecture of the translators.

The individual types of transient segments are described in more detail in the following text. An access segment ATS represents the control of access-related transactions. It produces an autonomous request on the basis of access resources, for example from each SETUP information item. Access resources may comprise an individual B-channel or D-channel of a subscriber, an individual connection line (trunk) or an associated bandwidth having a plurality of channels. The ATS additionally controls the triggering of appropriate feature segments FS for controlling access-related features.

A user segment UTS represents the control of user-related transactions. In this case, it in each case produces an individual request in accordance with user resources. The UTS additionally controls the triggering of user features.

A trunk group segment TGS controls the involvement of a trunk of a trunk group in a connection. The TGS segment in this case requires that the TGM manager carry out the selection of a trunk at the outgoing connection end, and informs it that the trunk at the incoming connection end is busy.

An associated segment AS associates a connection pair at the A-end and B-end. At the same time, it coordinates the setting up and clearing down of a connection and initiates the translation/routing activities by the NRM manager.

A feature segment FS controls the handling of subscriber-specific performance features. FS segments are inserted into an already existing call chain, if they are requested by a subscriber or by the network. Every FS segment contains feature-related logic and has access to feature-related data in the data base. The feature-related logic is thus centralized, by the FS segment, in a single software unit. Advanced intelligent network services are supported, for example, by an FS segment in that it forms an interface to a service control point (SCP). In principle, an FS segment can be inserted into the call chain between an ESIS segment and an ATS segment, an ATS segment and a UTS segment, or a UTS segment and an AS segment. This depends on factors such as the relevant trigger point and resource-related requests.

The sequence during the setting up of a connection for a standard call is described in the following text. The subscriber line module of a subscriber A initially detects a busy information item and then sends a SETUP information item to the group processor GP associated with it, at which point an ESIS segment is produced in order to receive this information item. The ESIS segment converts the received SETUP information item into a general SETUP information item for the call control system, requests an ATS segment and passes the general SETUP information item to the ATS.

The access segment ATS then requests access-related data from its access manager AM. The AM reads access-related data from the access data base, carries out an access-related busy/free handling operation, and, finally, passes the requested access-related data to the ATS. The ATS stores the access-related data, requests a UTS, and passes the SETUP information item to the UTS produced.

The UTS requests user-related data from its UM manager. The UM reads the requested data from the user data base, carries out a user-related busy/free operation, and passes the requested user-related data to the UTS. The UTS then requests an AS which, for its part, in turn requests dialed digits. The request for dialed digits is sent via an information item which the call chain [lacuna] from the AS inter alia to the ESIS at the A-end. At this point in time, the call chain at the A-end comprises ESIS-ATS-UTS-AS.

The ESIS now uses the type of signaling system to determine whether a dialing tone or a code receiver is required, and informs the switching control system PSS via the coordination system LSS. The PSS defines the optimum resource configuration and then requests an assignment and connection of the selected resources by the corresponding resource system RHS. The RHS stores the selection of physical resources and then controls the switching through of the selected resources. When the code receiver receives dialed digits, it sends them directly to the associated ESIS. The ESIS then produces a request to the coordination system LSS for the dialing tone to be turned off, converts the dialed digits to a standard representation, and the call chain then sends them to the AS segment.

The dialed digits in this case flow via the ATS segment and the UTS segment and are finally received by the AS segment. The AS sends the dialed digits to the NRM manager, which allows the dialed digits to be subjected to the necessary translation by the translator. As soon as the translation result is fixed, the NRM manager passes the result back to the AS segment, which then causes a UTS segment to be produced at the B-end.

Once the end of the dialing process has been identified, the ESIS segment at the A-end causes the code receiver to be switched off by means of a corresponding request to the switching control system PSS via the coordination system LSS. The switching control system PSS then commands the resource system RHS, which turns off and releases the said physical resource, namely the code receiver, again.

The UTS segment at the B-end now requests data from its user manager UM, which then checks the busy counter of the telephone number, and increments it. The UTS segment at the B-end then requests an ATS segment. The ATS segment then requests data from its access manager AM, which then checks the access-related busy/free status, and makes the access busy.

The ATS segment then requests an ESIS segment, which then passes the order to make it busy to the subscriber line module of the subscriber B, and sends the data required for this purpose. The subscriber line module then applies the calling current. The ESIS segment at the B-end now requests that the ringing tone be switched on by the coordination system LSS, which then emits an appropriate request to the switching control system PSS. The PSS determines the physical path through the switching networks affected by the call, and then requests the resource system RHS to assign and switch through the ringing tone.

The physical path in the rearward directions switched through at this point in time. The ringing tone at the A-subscriber end is thus supplied via the subscriber line module SLMB.

When the B-subscriber goes off hook, this is identified by the subscriber line module assigned to him. The subscriber line module then turns the dialing current off and sends an OFF-HOOK information item to the ESIS segment of the group processor GP assigned to it.

The ESIS segment then requests that the ringing tone be turned off, passes a CONNECT information item on through the call chain to the AS segment and in consequence causes the voice path to be set up in the forward direction. Communication via the voice paths can now take place.

The coordination system LSS according to FIG. 2 is described in more detail in the following text.

As already mentioned, the coordination system coordinates connection requests which originate from different segments. For this purpose, it stores the connection requests received from the different segments. In each case one coordination module LSM is provided for the storage of a connection request of one segment. Every time a new connection request is received from a segment, the status of these coordination modules is evaluated and updated. The control mechanism between the coordination modules ensures that the coordination system LSS always transfers a single, consistent switching command to the switching control system PSS.

In order to reduce any dynamic additional complexity for the communications requirement of the coordination system (internally between the coordination modules and externally between the coordination modules and the segments), the coordination system is strongly linked to the ESIS/CCS system. A coordination module is preferably in each case linked to a segment so firmly that connection requests from the segments to the coordination system or to the coordination modules represent local procedure calls.

Furthermore, the information between the segments is used in order to transmit coordination information between the coordination modules. This is worthwhile particularly when setting up a connection. Specifically, the setting up of a connection is particularly communications-intensive for the coordination system, since the receiver and tones must be turned on and off. Since the information flow between the coordination modules actually runs in parallel with the information flow of the segments, no additional increased complexity with respect to the communication of the call processing system is incurred if information between the coordination modules is embedded in information for communication between the segments.

Although the coordination system is thus very strongly linked to the ESIS/CCS system, a clear distinction nevertheless remains between the coordination system and the ESIS/CCS system, namely a well-defined procedure interface.

Apart from coordination of the connection requests of segments, the coordination system is also used for translating the connection requests into switching commands for the switching control system. The segments can thus be limited to a very abstract description in the formulation of their connection requests (abstract view of a connection), which regards the entire switching network as a black box.

The view of the segments and the coordination modules with respect to a connection is explained in more detail in the following text, with reference to FIG. 3.

Most segments have two links, namely link-X and link-Y. Segments for special performance features may, however, also have more than two links, for example the segment for implementing three-way calling has three directly adjacent segments in the call chain and thus three links. The segments in each case associate a specific connection end with each of their links. This association is defined by appropriate assignment in the production of the segment. According to this view, a segment always formulates a connection request with the aid of its logic links, for example "connect link-X to link-Y" or "connect link-X to an announcement".

A coordination module LSM which is permanently assigned to a specific segment has the same data fields as the associated segment for buffer storage of a connection request. A coordination module thus identifies the same links as its associated segment. In contrast to the segment, these links are, however, associated with the port address in the view of a coordination module.

For an ATM switching network, the connection end point assigned to a subscriber or to a connecting line means a VCI/VPI number. As already mentioned, for a coordination module, the connection end point means a VPI/VCI number at a specific port. The port address (including the busy VPI/VCI number) of a connection end point of the call chain is controlled by the access manager AM and is passed via the call chain to the appropriate coordination modules whenever an outgoing request from an active connection end point is identified.

For simplicity, a connection end point is designated a "port" in the following text, without having to mention the associated VPI/VCI number explicitly.

The view of a connection (connection view) of a coordination module comprises, in addition to the port address and the VPI/VCI number, the type of port affected as well (in this case, port can be understood to be in the sense of a connection end point). If a resource (passive port) is intended to be connected to a specific link, the type of resource is also indicated (for example announcement, broadcast tone, jumper) by the connection request of a segment. The actions of the coordination system for a received connection request from a specific segment depend on the connection status and the associated port types. The said status is in this case formed by the totality of the statuses stored in the coordination modules. Communication between the coordination modules is therefore possibly required in order to carry out a connection request. Examples of port types are: "active port" for ports which are assigned to a subscriber or to a connecting line, "announcement port", "jumper port", and "0 port" for no connections.

The internal control mechanism of the coordination system is described in the following text.

Stimulation signals from active ports which are associated with subscribers or connecting lines must be coordinated. For a standard call, there are two and only two active ports which are assigned to the A-end and B-end of the standard connection. In order to coordinate a stimulation signal from an active port, or to put it more precisely the connection request derived therefrom, a control mechanism is used. According to this control mechanism, the control over an active port is always assigned at a specific point in time to one and only one coordination module of the coordination system. If a coordination module has the said control over a port, it can send connection requests for this port to the switching control system PSS.

If a segment submits a connection request for a port over which its coordination module assigned to it has no control at this point in time, there are three alternatives: 1st alternative: the coordination module is authorized to request control over the port (connection end point) from another coordination module, 2nd alternative: the coordination module must wait until another coordination module releases control over the port, 3rd alternative: the coordination module is authorized to transfer the request to another coordination module which can achieve control over the port.

The selection of one of the said alternatives is carried out in accordance with priority rules which correspond with the priority rules for the segments of the ESIS/CCS system. In the case of the ESIS/CCS system, segments which are located closer to the signaling source (active port) have priority for signals which originate at their connection end. In an analogous manner to this, in the case of the coordination system LSS, those coordination modules which are located closest to the signaling source within the call chain have the highest priority for control of the active port at their connection end. This means that connection requests from segments which are located further away and are thus prioritized lower are made subordinate to those which are located closer to the active port. Connection requests which have been made subordinate are stored in the coordination module of the requesting segment, and become active as soon as the segment prioritized higher releases control over the active port.

In the case of the call control system CCS, the AS segment plays a central role as a linking element between segments at the A-end and the B-end. This central role is also maintained for the AS coordination module. The AS coordination module is the only coordination module which can achieve control over the port at the A-end and at the B-end. All the other coordination modules can achieve control only over the port located at their connection end.

Since the AS coordination module is the only coordination module which can simultaneously achieve control over the A-end and over the B-end, it is also the only coordination module which can transfer a switching command to the switching control system PSS which produces through-switching between the A-end and the B-end.

As a result of the central role of the AS coordination module, it becomes possible to limit the communication between the coordination modules to half of the call chain, the coordination of the two halves being managed by the AS coordination module. While a normal coordination module can never achieve control over an active port which is located on the other side of the AS coordination module, the segment which is associated with this coordination module can nevertheless send a connection request to the remote connection end. These remote connection requests must be transferred to the AS coordination module which can finally pass on the respective connection request to the switching control system as soon as it has achieved control over the ports involved.

The said priority rules apply in a, corresponding manner to a port of a remote connection end. A coordination module which is located closest to the remote connection end point is prioritized above the coordination modules located more remotely from the connection end point.

The explained control mechanism for connection requests to the coordination system is implemented by means of the internal structure of the data and the logic of the coordination system. In order to achieve effective coordination within the coordination system, the status information items contained in a coordination module, apart from the private connection data, also comprise information on the location in the call chain which currently has control over an involved connection end point. This information is updated whenever the said control is transferred to another coordination module. Connection requests to a coordination module originate either from a segment or from another coordination module.

Various connection control processes are explained in more detail in the following text, with reference to FIGS. 4 to 15.

In the said figures, horizontal arrows mean the flow of information between segments of the ESIS/CCS system, this information also containing information on the information interchange between the coordination modules LSM of the coordination system LSS. Vertical arrows mean the flow of information between the call control system CCS and the coordination system LSS. Vertical arrows which are drawn with double lines mean either the flow of information between the coordination system LSS and the switching control system PSS, or that between the switching control system PSS and the resource system RHS or the main switching network SNB. The procedure interface between the ESIS/CCS system and the coordination system LSS is not illustrated for all the information flows. Information between the switching control system PSS and the main switching network SNB is illustrated only in FIGS. 6 and 8.

The illustrated information flows comprise data which change the current status and/or the data fields of a coordination module LSM. Of the data fields of the coordination modules, the ct fields and cp fields are especially worthy of mention, in which information relating to each link of a coordination module LSM is stored, and which are described in more detail in the following text.

The contents of act field describe which resource or which link a link being considered is connected to or, to put it more precisely, is intended to be connected to. Thus, the latest connection request of a ESIS/CCS segment relating to each link of the segment is stored in the ct field. Since the ct fields reproduce the individual view of a segment with respect to the associated connection, they are also lodged by this segment and may never be changed by the communication between the coordination modules LSM. Valid types of ct fields are, for example, "link" (that is to say the connection is implemented from the view of the segments), "announcement/tone/jumper" (that is to say the segment has requested the connection of an announcement, a tone or a jumper to the corresponding link), or zero (that is to say the connection or the link has been cleared down again from the view of the segment).

The cp fields indicate the "connection end point" (CONNECTION END POINT) of a link under consideration. They contain the information on the port address of the physical entity which is associated with the link under consideration. For this reason, cp fields may be changed only on the basis of information between the coordination modules which pass on the control of an active port, and never on the basis of connection requests from segments. Valid information types for cp fields are "active port" (that is to say the coordination module has control, or the control is closer to the AS coordination module) or "announcement/tone/jumper/zero" (that is to say a coordination module which is located closer to the active port has achieved control again).

The cp fields are provided only for those coordination modules (to put it more precisely for those links of a coordination module) which can achieve control over the active port (active connection point) associated with the link under consideration, that is to say which can obtain the authorization to emit a switching command with respect to the active port controlled by them. For this reason, all the coordination modules at the A-end have only one cp field, namely for that link which leads to the port at the A-end. Analogous conditions apply in an appropriate manner to the coordination modules and links at the B-end. Thus, as the only coordination module, the coordination module AS has two cp fields since it can achieve simultaneous control over two "active ports" (that is to say can emit a switching command to connect two "active ports" to the switching control system PSS).

The already described priority rules are used to update the cp fields. The control over an active port is in this case passed on by a "CHANGE CONTROL" information item within the coordination system. This information item may contain the information "active port" (that is to say the control is offered to the next coordination module), "zero" (that is to say the control is passed back from a coordination module which is prioritized lower) or the information on a resource "announcement/tone/jumper" (that is to say the control is passed back from a coordination module which is prioritized lower, and the said resource is intended to be switched through to the opposite active port).

In the following figures which are to be explained, separate forwards/backwards switching is considered for the connection of receivers etc. In order that independent through-switching of the forwards direction and rearwards direction of a connection can be ensured, the control mechanism of the coordination system is also implemented independently for both connection directions. For this reason, separate cp/ct fields for the forwards and rearwards direction are provided for each link. In the information flows which are illustrated by the arrows, this is indicated by an index U or D for the cp/ct fields. While the index U represents the "upward to the remote port" direction, the index D represents the "downward to the port at this end" direction.

In the said figures it can clearly be identified that there is a change in the connection direction in the segment AS. This situation is explained because the segment AS represents the center of the call chain, and the connection direction having the index U on one half of the call chain corresponds to the connection direction having the index D on the other half of the call chain.

The logic connection requests contained in the cp/ct fields represent the status of the connection when all the information illustrated in the respective FIG has been processed. For the connection status illustrated in one FIG in each case, the path envelope is furthermore indicated underneath the information flows, which path envelope is passed back from the switching control system to the coordination system after executing a switching command. A list of brief explanations of designations which are used in the following figures now follows:

cpU=Connection end point upward
cpD=Connection end point downward
ctU=Connected to upward
ctD=Connected to downward
A=Subscriber at the A-end
B=Subscriber at the B-end
DT=Dialing tone
DF=DTMF receiver
RT=Ringing tone to the A-end
TN=Tone
lk=Link of the call chain
chA=VCI/VPI number on the SLUA link
chB=VCI/VPI number on the SLUB link
RHS=Resource system
SLU=Subscriber line unit
alloc=Allocation
con=Connection
transres=Translation result from the NRM/manager
prov=Provide The setting up of a standard connection is now considered once again with reference to FIGS. 4 to 8 and, in this case, especially the involvement of the coordination system LSS.

FIG. 4 shows the information flows after reception of the stimulation information item "off hook" as well as the status of the connection before receipt of the dialed digits. If the calling subscriber is an ISDN subscriber, then the allocation of a B-channel is initially produced by the access manager AM. In consequence, the segment ATS is the first segment in the call chain which receives the port address of the A-end. This port address is then passed back (in the information item "set up acknowledgement") to the segment ESIS, together with the data which relate to the signaling type of the present access. The coordination module of the segment ESIS can then store the passed-back port address in its cp field. By means of the port address, the ESIS coordination module has at the same time received control over the connection end point at the A-end (initialization of control).

The signaling type, which is present in FIG. 4, of the subscriber A requires that the dialing tone DT and the DTMF receiver be turned on. For this reason, a combined allocation/connection request is transferred to the switching control system PSS. The switching control system identifies that the resources DT and DTMF are available in the subscriber line unit SLUA of the subscriber A, and orders the controller SLUC of the said subscriber line unit to switch such that the said resources are turned on in an appropriate manner via the internal switching network ASNS.

It can be seen from FIG. 4 that the setting up of a connection from the view of the segment ATS is already completed before receipt of the dialed digits, since the ct fields of this segment are already busy for both connection directions. Further information on call processing, which likewise relates to the control of the setting up of a connection, is thus passed on by this segment without being influenced.

FIG. 5 shows the receipt of the dialed digits and the status of the connection before receipt of the translation result. The dialing tone is turned off on receipt of the dialed digits. Within the call control information item "digits", the coordination system information item "change control" for the coordination modules is at the same time passed on, by means of which the control over the connection end point at the A-end is passed on as far as the AS coordination module.

Figure 6:
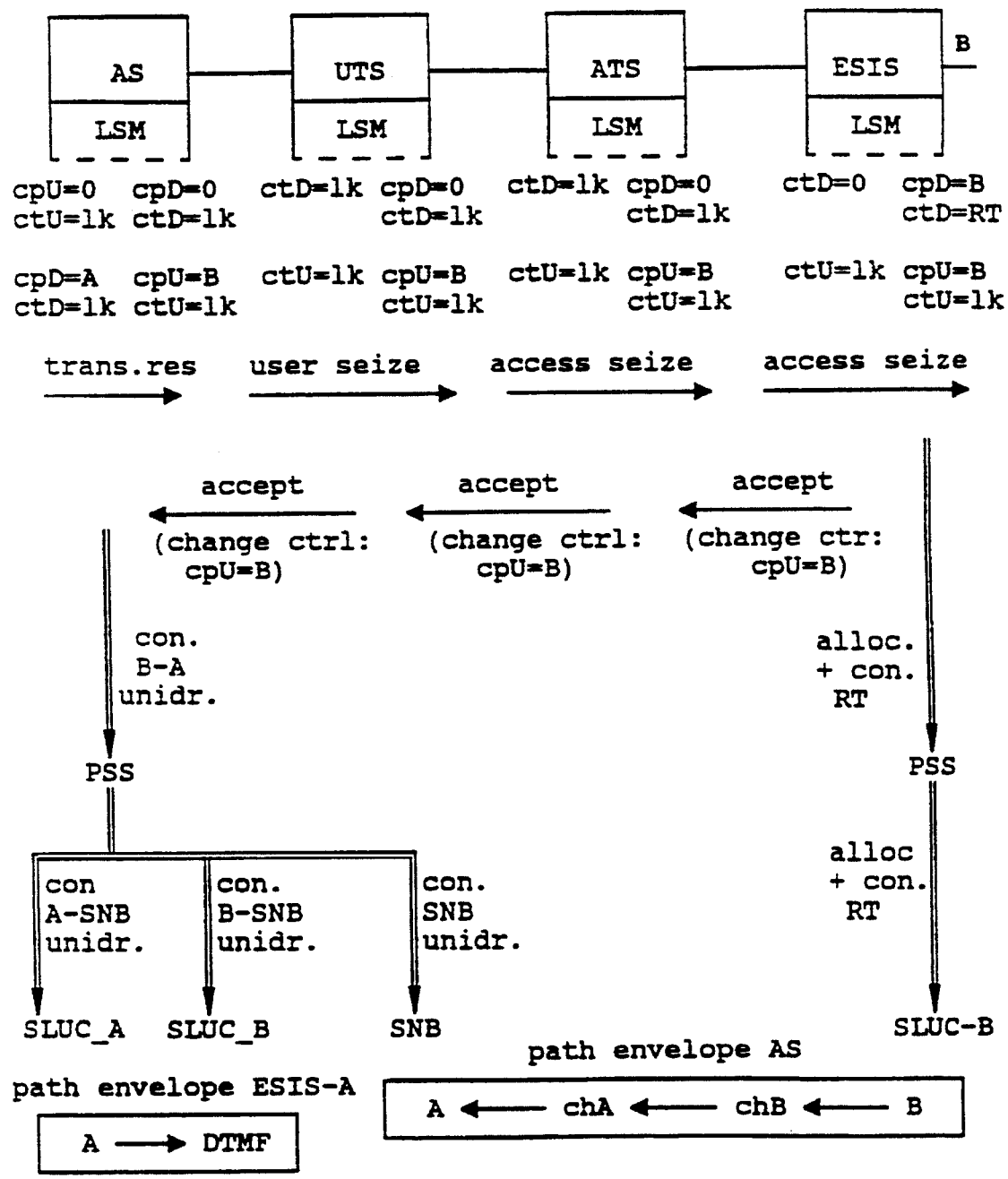

FIG. 6 shows the situation after receipt of the translation result, as well as the status of the connection at the B-end before the "end of dial" information item has been produced. After receipt of the translation result from the NRM manager, the port at the B-end is logically made busy by the access manager. The port address which is required for making it busy must therefore be passed together with the "access seize" information item down the call chain as far as the segment ESIS. The coordination module of the segment ESIS will at this point initialize its cp fields with this port address.

The illustration in FIG. 4 is based on the assumption that the ringing tone is applied via the subscriber line unit SLUB of the B-subscriber for the purpose of synchronization of bell signals and the ringing tone. This means that the ringing tone is switched through via the SLUB of the B-subscriber to the subscriber at the A-end, in a unidirectional manner. As soon as the coordination module of the segment ESIS receives the "access seize" information item, it commands the switching control system to switch through the ringing tone to the subscriber line unit (line card) of the B-subscriber and transfers, embedded in the "accept" information item, the "change control" information item to the call control system, up the call chain, as far as the AS coordination module. The coordination modules up as far as the AS coordination module write the port address of the B-subscriber in their cp fields while "change control" is being passed on.

Since the AS coordination module now has control over the two active ports A and B in the rearwards connection direction, it can now cause the connection to be switched through in the rearwards direction, by means of an appropriate command to the switching control system PSS.

If the A-end and the B-end belong to different subscriber line units, the switching control system PSS must [lacuna] the through-switching of the connection via three switching networks, namely the switching network ASNS of the subscriber line unit SLUB, the switching network ASNS of the subscriber line unit SLUB and the main switching network SNB. The switching control system executes the command in that it initially requests the controllers SLUCA and SLUCB of the appropriate subscriber line units to network the links to the main switching device SNB. If the two said controllers have reported the dialed links and VCI/VPI numbers for the main switching network SNB to the switching control system, the switching control system can bring about the connection of the links via the main switching network SNB.

As long as the subscriber connection end of the B-subscriber is not activated, no bell signal is produced, since, until this point in time, the B-subscriber could always still go off hook in order to initiate another call. It must be possible for the call processing to handle even this extremely rare case. The bell signal and the ringing tone are therefore not applied in synchronism with one another until the "set up complete" information item has been received at the B-end. After this point in time, going off hook is interpreted as a response.

Figure 7:
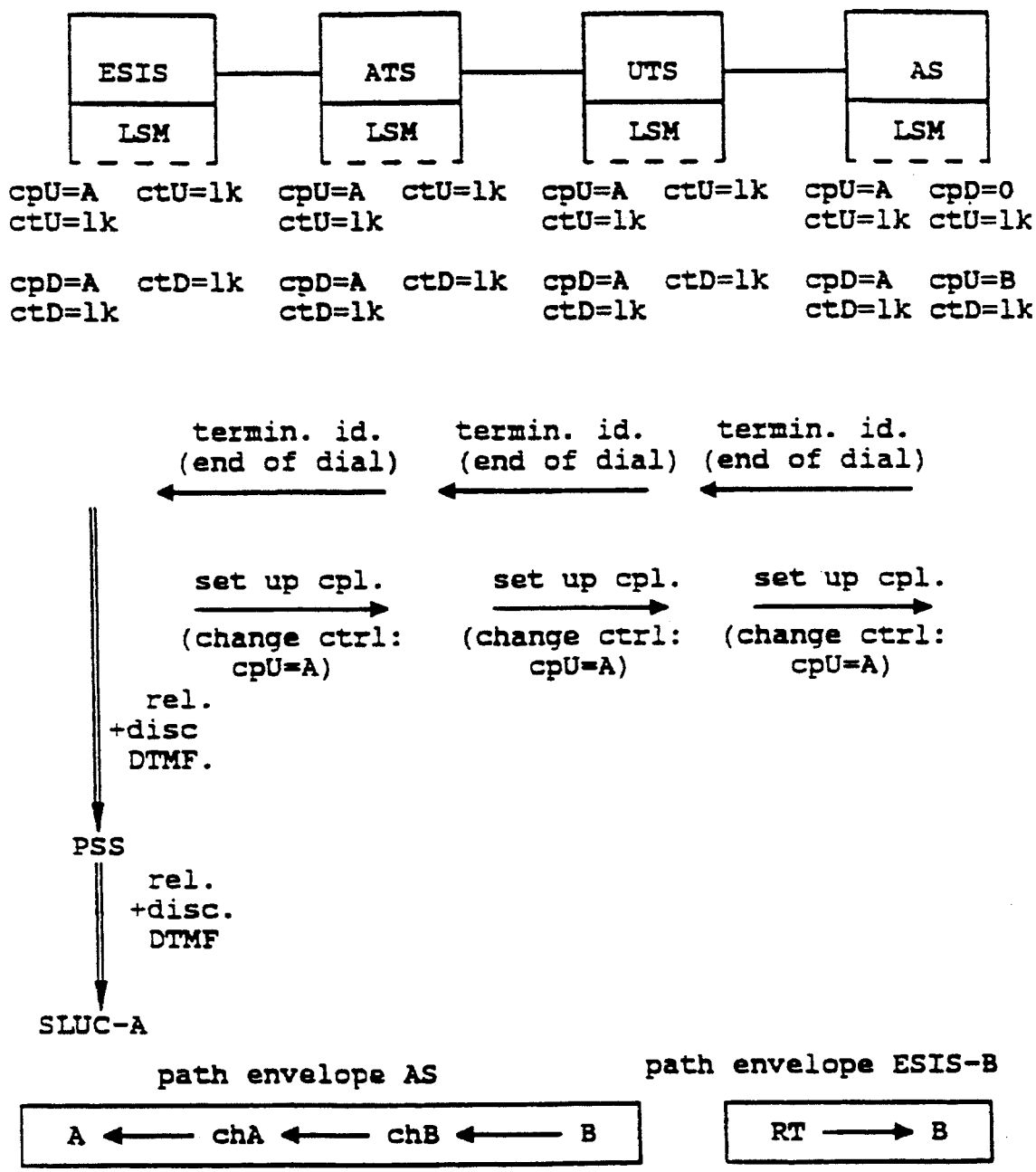

FIG. 7 shows the status of the connection at the A-end after receipt of the "end of dial" information item and before the B-subscriber has gone off hook. When the segment ESIS at the A-end receives the "end of dial" information item, it causes the DTMF receiver to be turned off. The "change control" information item for updating the cp fields of the coordination modules at the A-end is then passed up the call chain to the AS coordination module, once again embedded in a call processing information item, namely in the "set up complete" information item.

Figure 8:
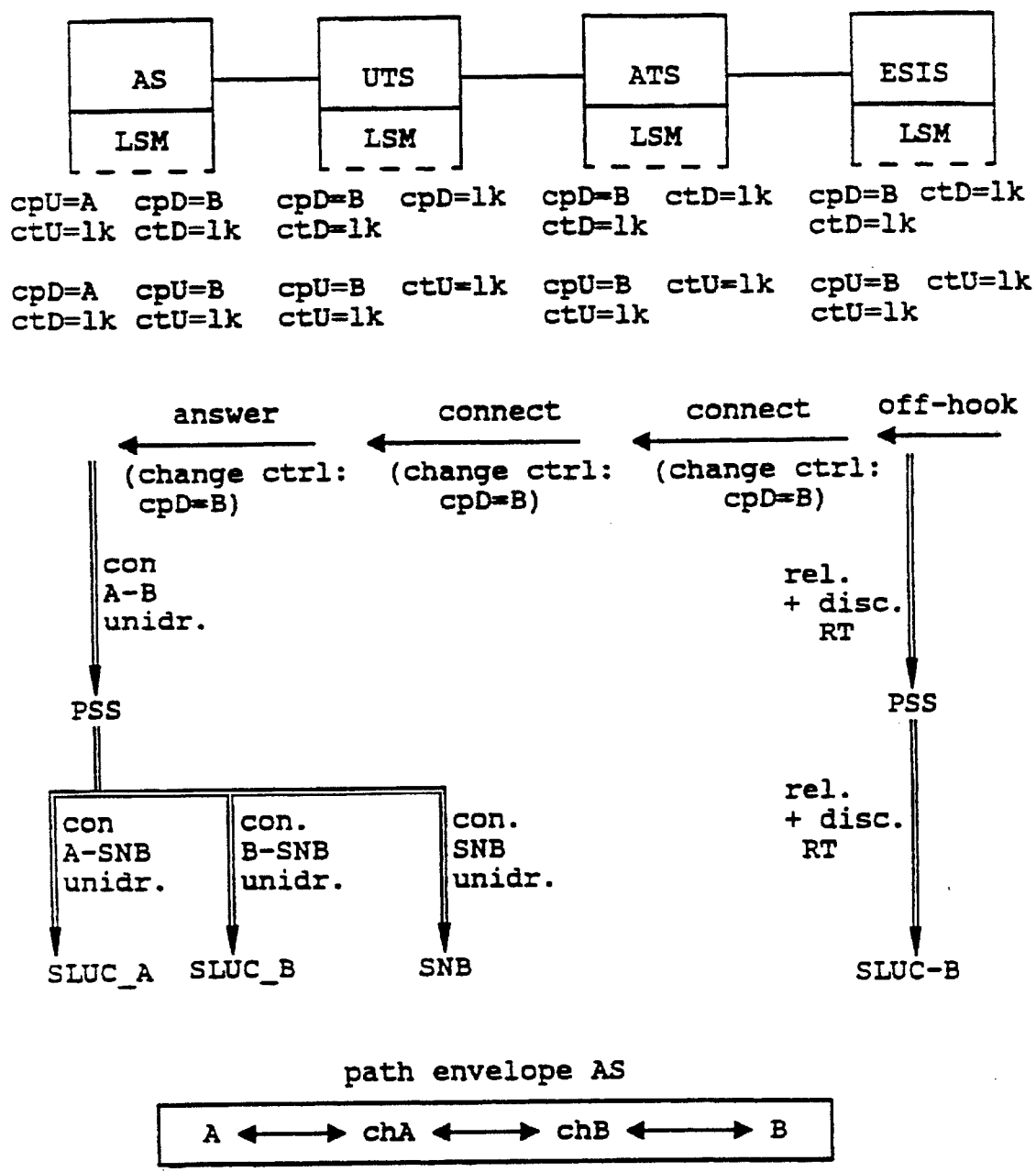

FIG. 8 shows the status of the connection at the B-end on completion of the setting up of the connection, as well as the previous sequence, with reference to the information flows. As soon as the ESIS coordination module at the B-end receives the "off hook" signaling information item, it causes the ringing tone to be switched off. In addition, it sends the "change control" information item up the call chain (embedded in the "connect" call processing information item) in order to update the other coordination modules at the B-end. Finally, after receiving control, the AS coordination module causes the forwards connection direction to be switched through from A to B.

The method of operation of the coordination system is explained in more detail in the following text, with reference to further examples which are illustrated in FIGS. 9 to 15.

FIG. 9 shows the application of a tone to a stable call. In this example, a feature segment FS1 breaks into the call chain at the A-end during a stable call. The coordination module which is associated with the feature segment FS1 is then initialized in accordance with the instantaneous connection status. On the basis of the initialization, the FS1 coordination module identifies that the control over the active port at its connection end is instantaneously with the AS coordination module. Since the FS1 coordination module has priority over the AS coordination module, it can move the control over the active port back therefrom. This is necessary, for example, if the FS1 coordination module wishes to apply a tone at the A-end. In this case, it sends a request, which is embedded in a "change control" information item, to receive control over the A-end up the call chain to the AS coordination module. The AS coordination module then interrupts the connection between A and B and passes control over the A-end to the FS1 coordination module. Since the said request to receive control passes through every coordination module located between the FS1 coordination module and the AS coordination module, all these coordination modules identify that the control over the A-port has now changed to the other connection end as seen by them. As soon as the FS1 coordination module has received control over the A-port, it can submit a connection request to the switching control system PSS in order thus to produce the connection between port A and the tone.

Figure 10:
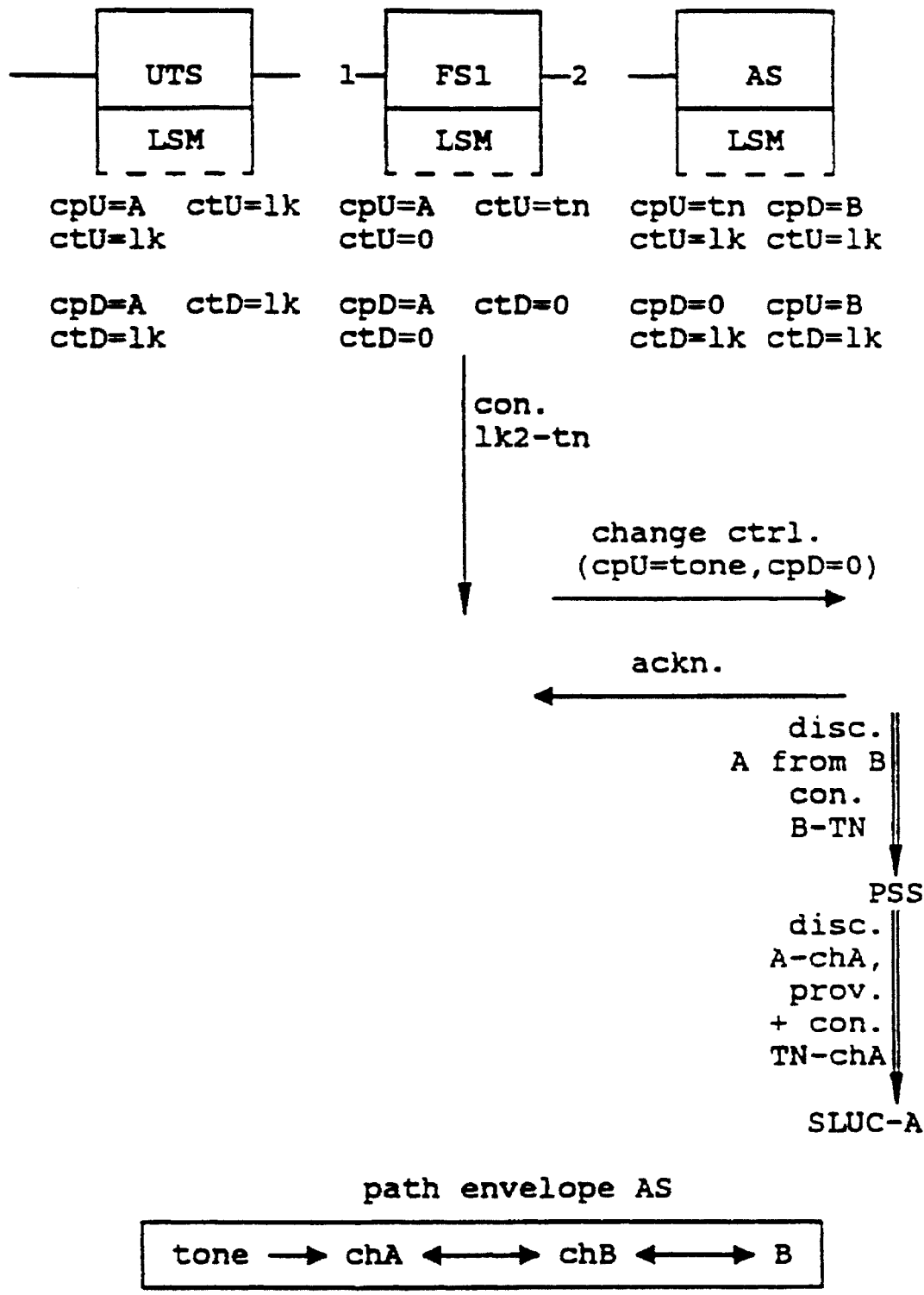

FIG. 10 shows the application of a tone to the remote connection end, namely the B-end in this case. In an analogous manner to the sequence according to FIG. 9, the request to receive control is also passed on here, originating from the FS1 coordination module, to the AS coordination module, which has control over the A-end and the B-end. At the same time as the request to receive control, the connection request submitted to the FS1 coordination module is additionally passed onto the AS coordination module, since the FS1 coordination module cannot achieve control over the B-end. The AS coordination module implements the connection request by means of an appropriate command to the switching control system. Control over the port A is passed back to the feature segment FS1 in the "acknowledge" acknowledgement message to the feature segment FS1. FIG. 10 shows the situation after all the coordination information has been interchanged: FS1 has control over the port A, while the connection between the B-end and the tone is implemented in the AS coordination module (that is to say only the AS coordination module has a path envelope!). As soon as the FS1 segment ends the connection request with respect to the application of the tone, the associated FS1 coordination module dispenses with control over the A-end. In consequence, the AS coordination module receives control over the A-end back, and the original connection between A and B is produced again.

As has already been illustrated a plurality of times with respect to FIGS. 4 to 10, the switching control system in each case produces a path envelope in order to carry out a connection request, and transfers this path envelope to the coordination system after executing the connection request. For its part, the coordination system now passes the path envelope which has been produced back to the switching control system for every new connection control process again, for example for every request to clear down a connection, to interrupt a connection or to reconfigure a connection. In these said cases, the switching control system evaluates the path envelope once again, in order to execute one of the said connection requests. In order to ensure flexible path handling for the said connection requests, especially the complex connection request for reconfiguration of a connection, the switching control system makes two functions available to the coordination system, namely a release function and a disconnect function, which are initiated by the "release" and "disconnect" requests respectively. On the basis of the release request by means of which the path envelope is simultaneously transferred to the switching control system, the complete path is cleared down. The switching control system in this case commands the resource system RHS to release all the resources associated with the connection and to clear down local paths. The switching control system furthermore also causes the paths via the main switching network to be cleared down, in that it sends appropriate commands to the modules of the main switching network, which produce the header translation.

On the basis of the disconnect request, by means of which the path envelope to the switching control system is likewise simultaneously transferred, the path chain is only slightly changed. The connection is interrupted at one end of the path affected by the disconnect request, while the other end of the path remains in the path chain of the path envelope. The path envelope passed back to the coordination system contains the new path configuration (see FIG. 9).

The coordination system selects the suitable request on the basis of its internal data. For example, the coordination system uses a release request to end a call. In the case of reconfigurations, for example if a feature coordination module requests control over an active port, in order to provide an announcement (see FIG. 9 and FIG. 10), the most sensible response is to submit a disconnect request to the switching control system, since the old connection status will undoubtedly be produced again as soon as the announcement has been completed.

In the case of a disconnect request, the coordination system must additionally indicate the interruption point. The interruption point is in this case selected such that it changes the existing configuration as little as possible. For this reason, the interruption point is as far as possible always located at that connection end over whose active port the associated feature coordination module requests control. If, for example, a feature coordination module at the A-connection end requests control over its corresponding A-port, it is relatively probable that the requested resource is likewise available on the subscriber unit at the A-connection end. The first preference for allocation of a resource is therefore always the subscriber unit at the near end, while a central control processor GP which has jurisdiction is used as the second preference.

An example of a remaining path chain, which is stored in the path envelope for the AS coordination module after executing a disconnect request from the A-connection end, is illustrated in FIG. 9.

For the implementation of the disconnect function, only the requested active port is passed on via the coordination module chain of the coordination system (that is to say no data which relate to the associated path chain are passed on among the coordination modules of the coordination system). A simple solution for handling the path envelope within the coordination system results from this. According to this solution, one and only one path envelope is always permanently assigned to one coordination module. The path envelope contains path segments which were assigned to the connection by the switching control system in response to a connection request.

In order to avoid resources hanging in the air (path resources without any assignment to an active port), path segments must always be associated with at least one active port. Therefore, whenever a coordination module releases control over an active port, this coordination module must ensure that all the path elements associated with this port are cleared down by an appropriate request to the switching control system. If the coordination system emits a disconnect request relating to a passive port, that is to say a port which is assigned to a resource, it is necessary to ensure that the associated resource is released by the switching control system again.

Since every segment has its own private view of a call, it is possible for a plurality of feature segments to request the application of a plurality of tones at the same time. In this case, essentially two different cases can occur, namely a first case in which two feature segments submit connection requests with respect to the same port, and a second case in which two feature segments submit connection requests to the coordination system relating to different ports.

In the first case, that feature segment which is located closest to the port under consideration is always carried out. This means that the tone requested by this feature segment is physically applied as the first. The other feature segment must wait until the feature segment having priority releases control over the port. As soon as the feature segment having priority releases control, the other feature segment can implement its private view of the call.

In the second case, in which two feature segments wish to apply tones to different ports, no competition situation occurs. These tones can thus be physically applied and switched through at the same time. This is even possible in the case of tones which must be switched through to remote ports, since the two connection directions are switched through independently of one another.

A more complex example of a call, namely a three-way call, is explained in more detail in the following text, with reference to FIGS. 11, 12, 13, 14 and 15.

Figure 11:
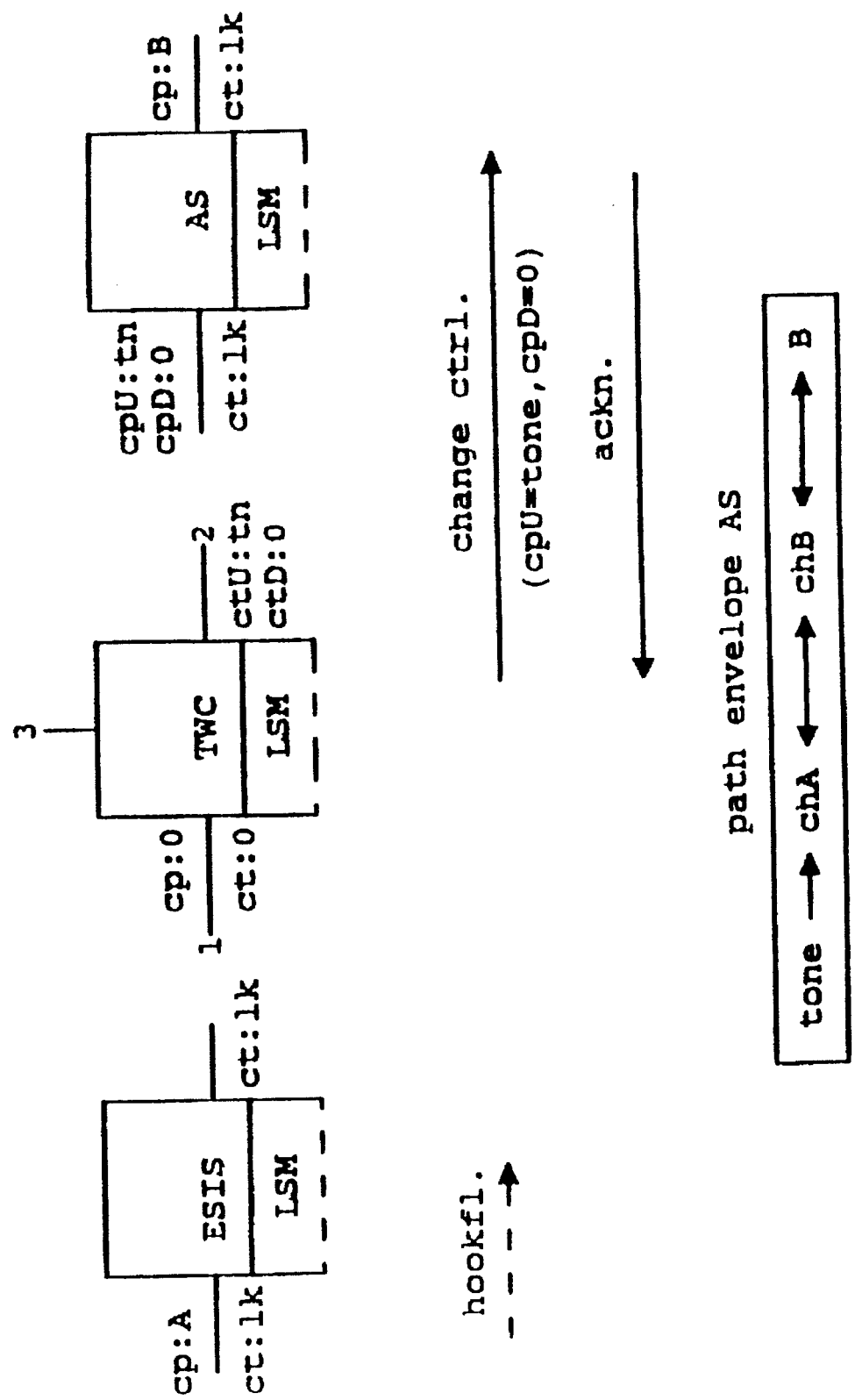
Figure 12:
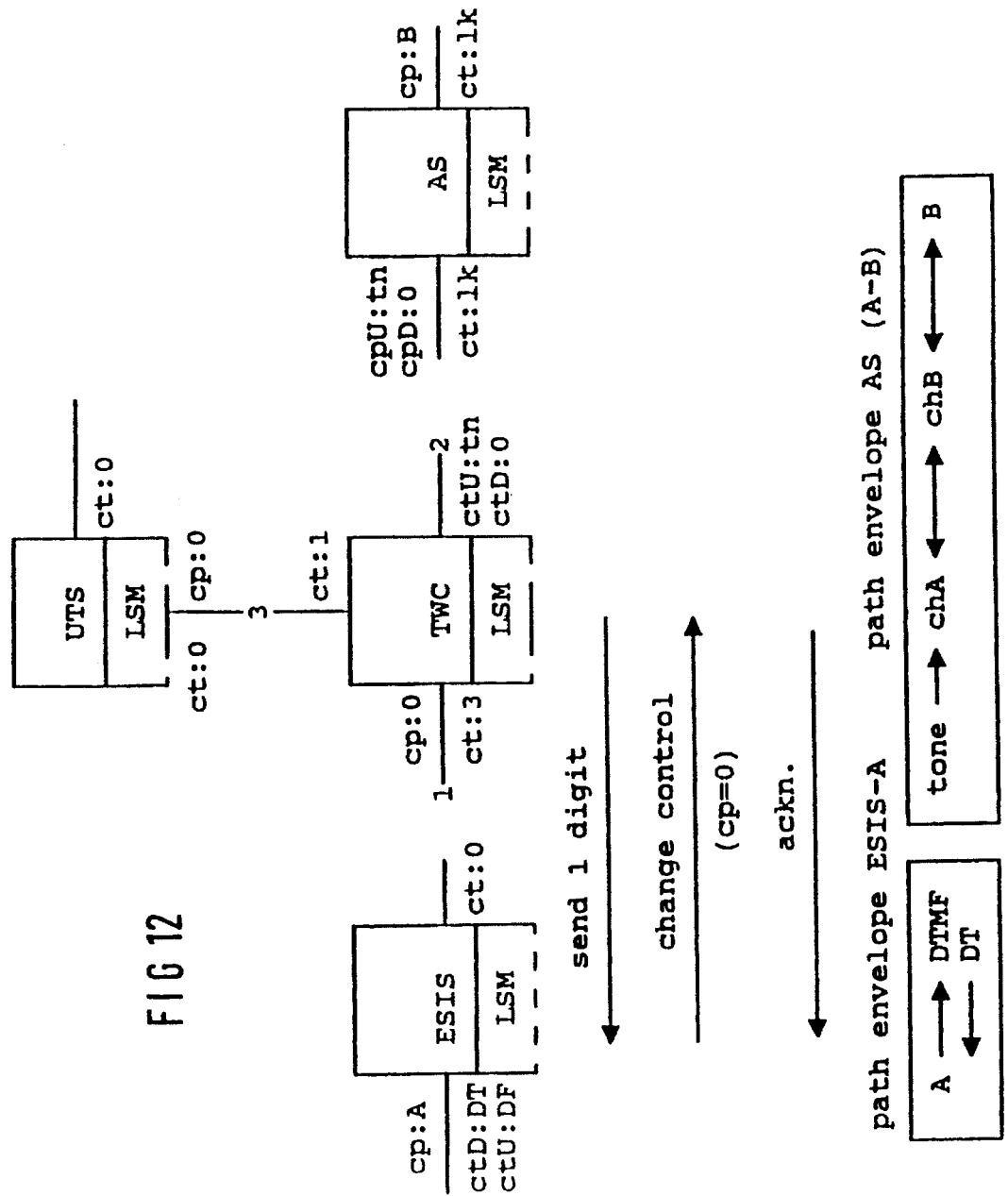

FIG. 11 shows an existing stable call, in the case of which the A-connection end initiates a three-way call. In this case, a tone is applied to the B-end, and control over the A-end is passed on to a three-way segment TWC.

In order to make it possible to dial a new number from the A-end, a dialing tone DT and an appropriate dialing tone receiver are switched through by the ESIS segment to the port at the A-end. For this purpose, control over the port at the A-end has been transferred to the ESIS coordination module. This situation corresponds to the illustration in FIG. 12, in which two tones, namely a holding tone for the B-end and a dialing tone for the A-end, are physically switched through.

Figure 13:
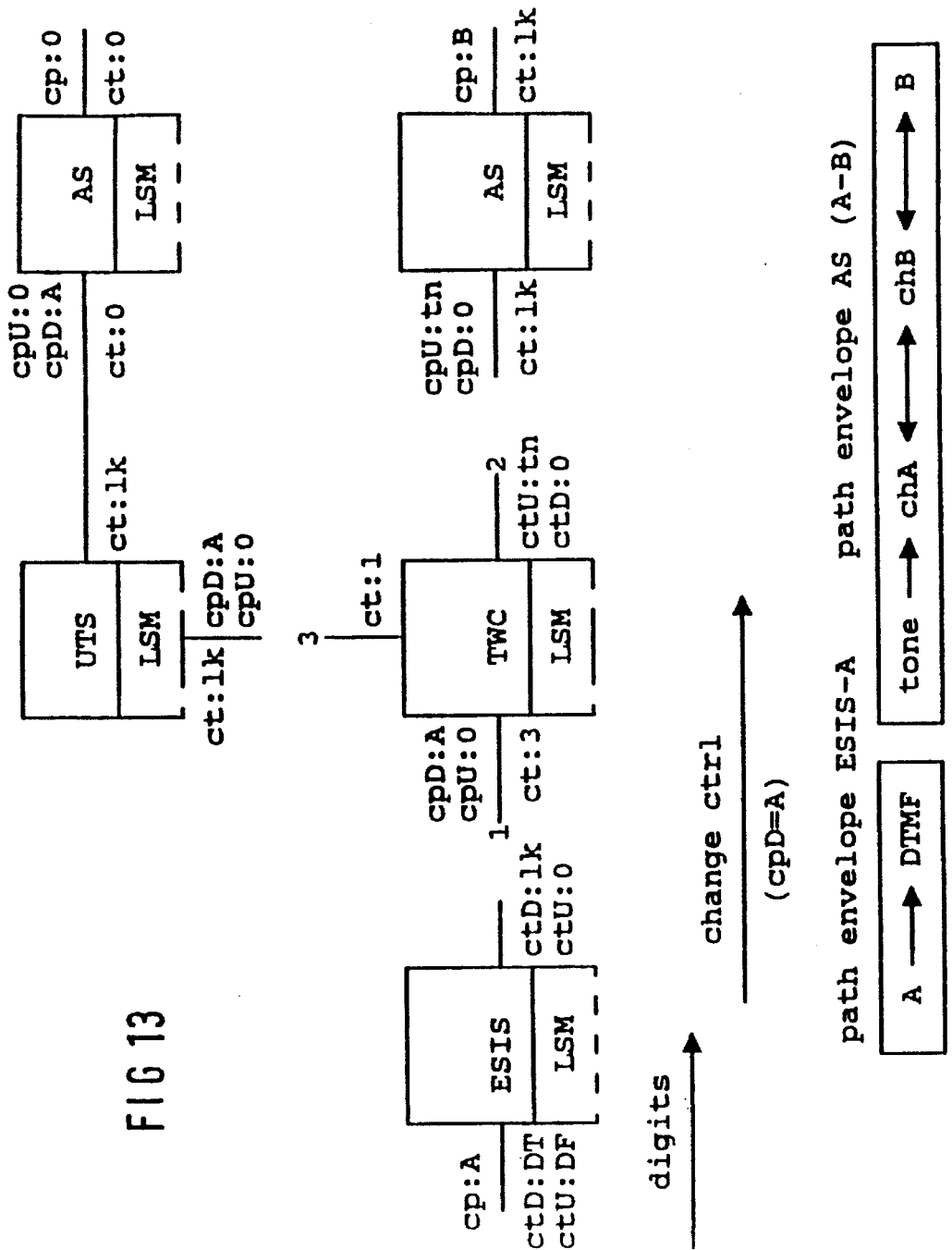

As soon as the first digit is received, the dialing tone can be turned off. The ESIS coordination module thus releases control over the port A in the rearward direction. The control over the port A (rearward direction) is passed onto the AS coordination module of the connection "A-C", since the branching position of the TWC coordination module is set to the connection "A-C". FIG. 13 shows the situation after interchanging all the appropriate information of the coordination system.

FIG. 14 shows the connection which is set up between the A-end and the C-end. At this point in time, control over the ports A and C is located in the AS coordination module of the connection "A-C".

FIG. 15 shows the final status of the three-way call, in which all the connection ends involved are connected to a jumper. While the connection requests of the initiating connection end (A-end) are passed on by the TWC coordination module to the switching control system PSS, the connection requests for the other connection ends (B-end and C-end) are passed on by the appropriate AS coordination modules to the switching control system. This situation is sketched in FIG. 15 by the various path envelopes which are passed back to the respective coordination module from the switching control system. In the case of the example in FIG. 15, it is assumed that the jumper is available on the subscriber line unit SLUA at the A-end.

In the final status of the three-way call, the control over the port A is located in the TWC coordination module. The control over the ports B and C is located in the respective AS coordination modules.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A coordination system for coordinating connection requests of a modular connection system to a switching control system, the connection system controlling connections at a logic level, and the switching control system controlling connections at a physical level, the coordination system comprising: coordination modules having:

a) means for receiving and buffer-storing connection requests produced from the connection system for an active connection end point involved with a connection, b) means for passing on a connection requests, which is buffer-stored by the coordination modules, to the switching control system when the coordination modules have received control over an active connection end point, and c) means for surrendering control over a specific active connection end point to one another such that only one coordination module has control over this specific active connection end point at a specific point in time.

2. The coordination system as claimed in claim 1, wherein the coordination system further comprises a control surrendering mechanism between the coordination modules, the control surrendering mechanism providing that a) a coordination module having a lower priority must wait until control has been passed to it by a coordination module having higher priority, while b) a coordination module having higher priority can request control from a coordination module of lower priority.

3. The coordination system as claimed in claim 1, wherein the coordination system further comprises:

a) coordination modules of a first type which achieve control over in each case one active connection end point of a connection, b) coordination modules of a second type which achieve control over in each case two active connection end points of a connection, there being in each case only one coordination module of the second type per connection end point pair in a coordination module chain of a connection, and c) priority control in accordance with which a respective coordination module has higher priority with respect to control of a connection end point the closer the respective coordination module is to the end point in the coordination module chain.

4. The coordination system as claimed in claim 2, wherein a respective coordination module is able to pass on a connection request for a connection end point over which, in principle, the respective coordination module cannot achieve control to another coordination module which can achieve control over this connection end point.

5. The coordination system as claimed in claim 1, wherein the connection system has a plurality of modules, and wherein a) only one coordination module is permanently assigned to each module of the plurality of modules in the connection system, and b) communication of the coordination modules takes place via communications channels of the modules of the plurality of modules in the connection system.

6. The coordination system as claimed in claim 1, wherein a transfer of a connection request into a coordination module conforms with a procedure call.

7. The coordination system as claimed in claim 1, wherein the coordination modules translate the connection requests passed to them in each case into a connection command which is comprehensible for the switching control system.

* * * * *